(12) United States Patent
Friedman et al.

(10) Patent No.: US 7,991,591 B2
(45) Date of Patent: Aug. 2, 2011

(54) SYSTEM AND METHOD FOR DESIGNING ELEVATOR CAB AND LOBBY INTERIORS

(75) Inventors: Harold S. Friedman, New York, NY (US); Jeffrey Friedman, New York, NY (US)

(73) Assignee: Harold S. Friedman, New York, NY (US)

( * ) Notice: Subject to any disclaimer, the term of this patent is extended or adjusted under 35 U.S.C. 154(b) by 746 days.

(21) Appl. No.: 11/999,085

(22) Filed: Dec. 3, 2007

(65) Prior Publication Data

US 2008/0154553 A1 Jun. 26, 2008

Related U.S. Application Data

(63) Continuation-in-part of application No. 11/384,606, filed on Mar. 20, 2006, now Pat. No. 7,305,329, which is a continuation-in-part of application No. 10/294,026, filed on Nov. 14, 2002, now Pat. No. 7,016,817.

(51) Int. Cl.
*G06F 17/50* (2006.01)

(52) U.S. Cl. .............. 703/1; 52/30; 187/401; 434/79

(58) Field of Classification Search .......... 703/1; 52/30, 52/235, 274; 182/141; 187/401, 414; 446/137; 348/739; 382/100; 434/72, 79, 80
See application file for complete search history.

(56) References Cited

U.S. PATENT DOCUMENTS

| | | | | |
|---|---|---|---|---|
| 3,621,635 A * | 11/1971 | DeLange | | 52/235 |
| 3,631,942 A * | 1/1972 | Brounn | | 187/401 |
| 3,849,930 A * | 11/1974 | Stubbmann | | 446/137 |
| 4,357,993 A * | 11/1982 | Halpern et al. | | 187/401 |
| 5,601,431 A * | 2/1997 | Howard | | 434/79 |
| 6,122,391 A * | 9/2000 | Ringland et al. | | 382/100 |
| 6,922,701 B1 * | 7/2005 | Ananian et al. | | 1/1 |
| 2001/0047251 A1 * | 11/2001 | Kemp | | 703/1 |
| 2002/0066256 A1 * | 6/2002 | Oberpriller et al. | | 52/745.13 |
| 2002/0113909 A1 * | 8/2002 | Sherwood | | 348/739 |

OTHER PUBLICATIONS

Harper, G.N. BOP—An Approach to Building Optimization, Proceedings of the 1968 23rd ACM National Conference, Jan. 1968, pp. 575-583.*

* cited by examiner

*Primary Examiner* — Russell Frejd

(57) ABSTRACT

A system and method of interior design is provided having an interface for displaying a design report; providing a selection of predetermined architectural designs which can be selected from the design report; wherein each of the predetermined architectural designs includes a plurality of design elements selected from the group of optional elements, non-optional elements, and selectable elements; providing a choice of at least one of the optional and selectable elements for inclusion in a selected predetermined architectural design; and determining design parameters based upon chosen optional elements, non-optional elements, and selectable elements in the selected predetermined architectural design.

11 Claims, 23 Drawing Sheets

FIG. 1a

| | | DATE SUBMITTED: | | | Approval constitutes acceptance of design and all terms as follows: | |
|---|---|---|---|---|---|---|
| | | DESIGN NUMBER: | | | | |
| NECD JOB #: | | contact: | | Approved: | | contact |
| Building Owner / Manager: | | | | Print Name: | | phone |
| Elevator Service Contractor: | | | | | | |
| Number Cars: | | Remodel cabs | | Date: | | e-mail |
| Design Designation | | | | | | |
| NEW EQUIP. | | (E = Existing, N = New, R = Refinish existing material, X = Not provided in scope of work) | | SAMPLE SUBMITTED | | |
| Yes | No | MATERIAL | DESCRIPTION / INFORMATION | Sample 1: | Date: | |
| | | Top Ceiling / Canopy | | APPROVED: | | |
| | | Drop Ceiling | | Sample 2: | Date: | |
| | | Emergency Exit | | APPROVED: | | |
| | | Lighting | | Sample 3: | Date: | |
| | | Emergency Lighting | | APPROVED: | | |
| | | Exhaust Fan | | Schedule: | | |
| | | Panel Binders | | | | |
| | | Wall Panels REAR | | | | |
| | | Wall Panels SIDE | | | | |
| | | Rail | | | | |
| | | Front Wall | | | | |
| | | Car Door | | | | |
| | | Car Saddle | | | | |
| | | Base | | | | |
| | | Flooring | | | | |
| | | Protection Pads | | | | |
| | | Pad mounting | | | | |

General Notes:

1. Size of new panels will be engineered by NECD to fit within the existing elevator car enclosure dimensions.
2. All materials utilized will be in strict accordance with ANSI / ASTME Code requirements.
3. Estimated Addition Weight of Cab: _____
Note: Additional weight above is calculated by the total cumulative weight of new cab components being provided less any materials being removed by NECD from existing cab interior. It does not include calculations for any equipment not being supplied or installed by NECD.
Note: Inside car dimensions may be reduced up to 1 1/2" in depth and 1 3/4" in width based on existing conditions of elevator cab enclosure.
New Clear Height Inside Car: _____

Customer Responsibilities:

- All necessary permits required as well as any filing fees.
- Removal / reinstallation of car doors or elevator fixtures required.
- Balancing of elevator for new cab weight.
- Any engineering information required from others (ie. car door equipment templates, fixture templates, etc.)
- Deposit payment with approval as per contract.

THIS FORM AND RENDERING ARE THE PROPERTY OF NATIONAL ELEVATOR CAB AND DOOR CORP AND MAY NOT BE REPRODUCED WITHOUT WRITTEN PERMISSION

FIG. 1b

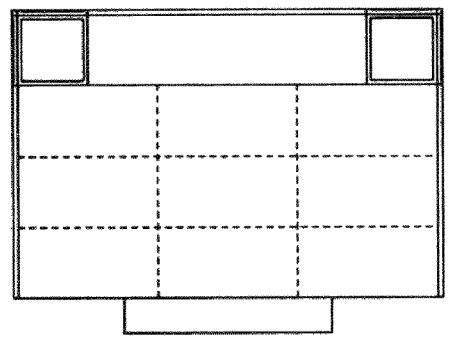
CEILING
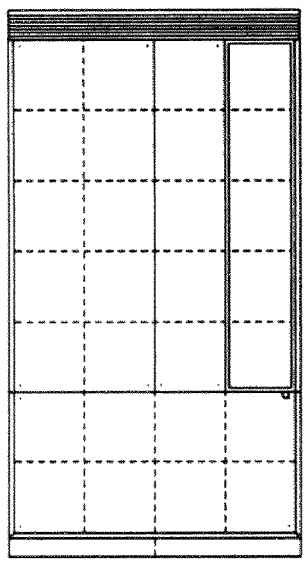
SIDE ELEV
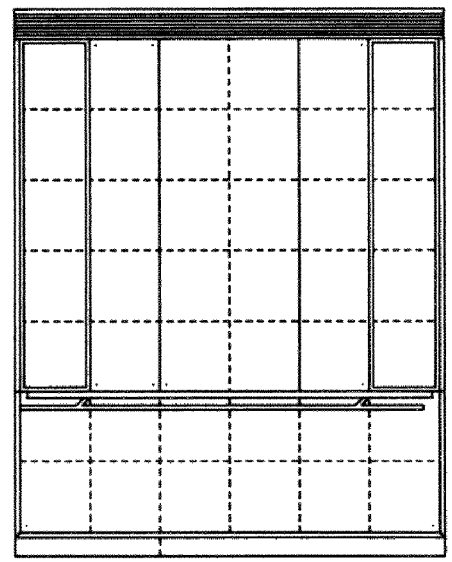
ELEVATION
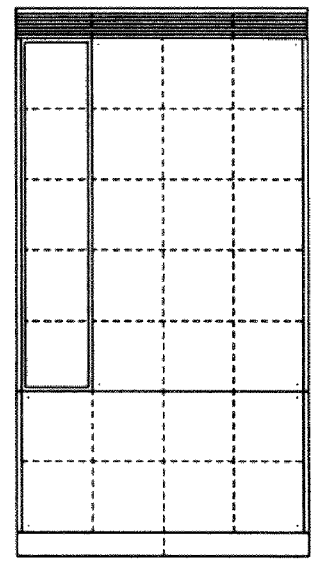
SIDE ELEV
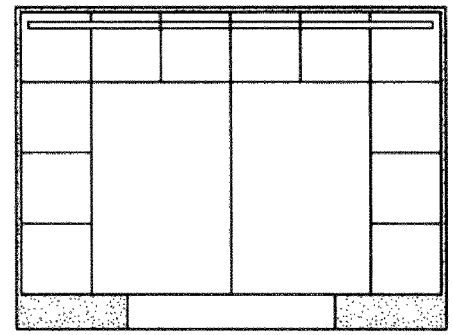
PLAN
NATIONAL ELEVATOR
SCHEME R-3
FIG. 16b

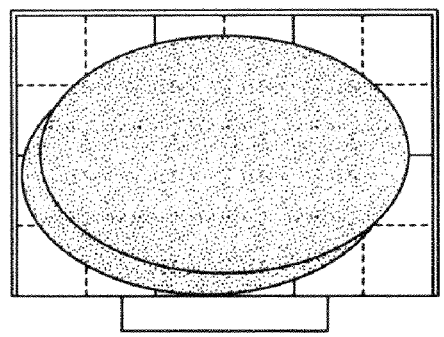
CEILING
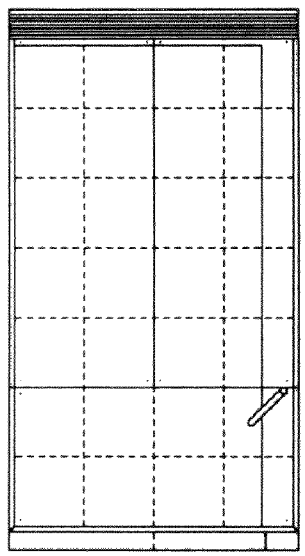
SIDE ELEV
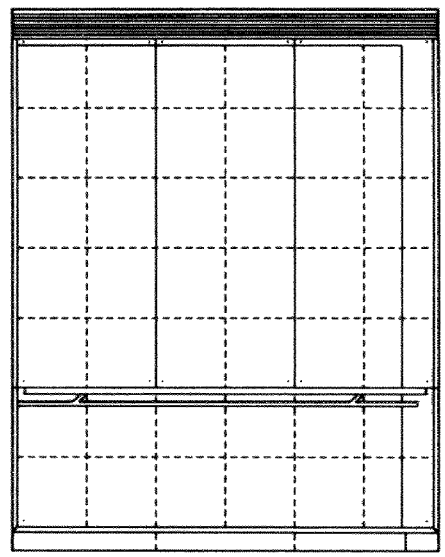
ELEVATION
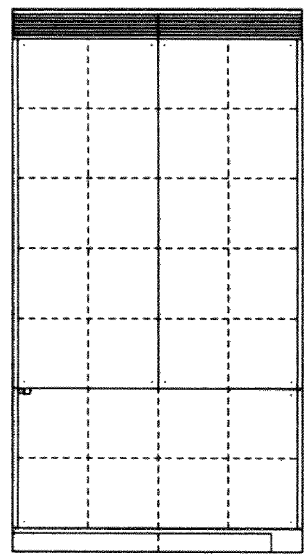
SIDE ELEV
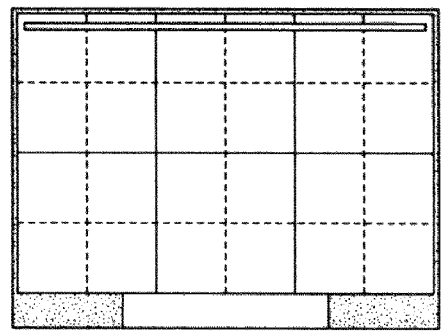
PLAN
NATIONAL ELEVATOR
SCHEME R-1
FIG. 16c

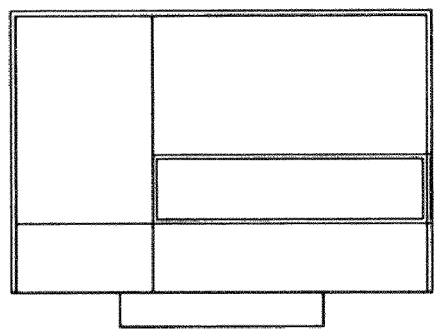
CEILING
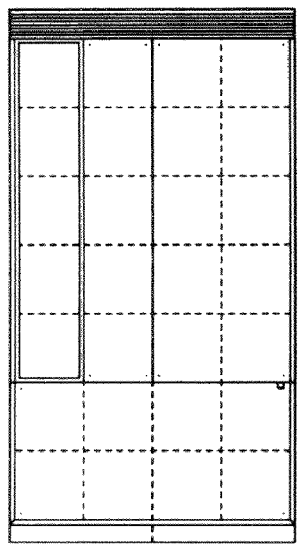
SIDE ELEV
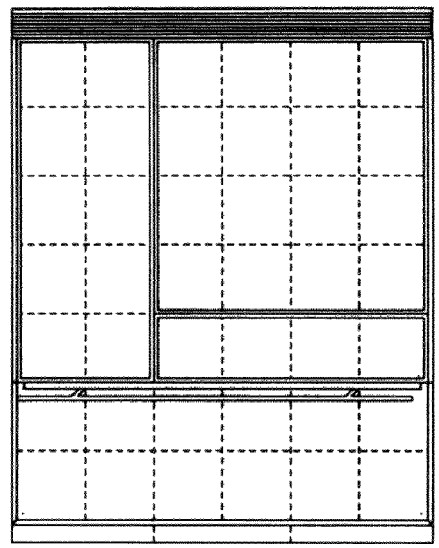
ELEVATION
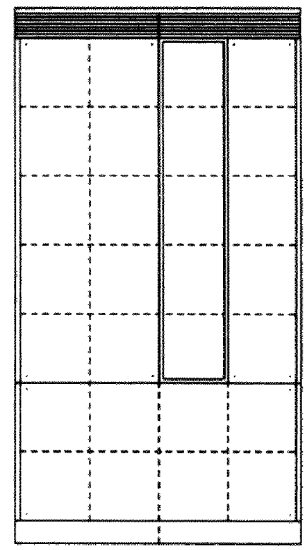
SIDE ELEV
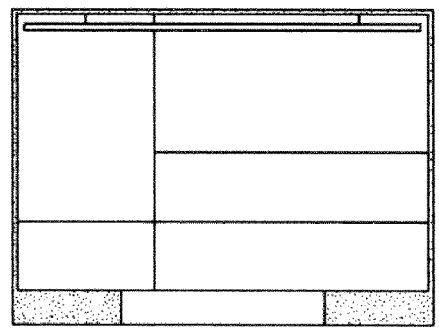
PLAN
NATIONAL ELEVATOR
SCHEME R-2
FIG. 16d

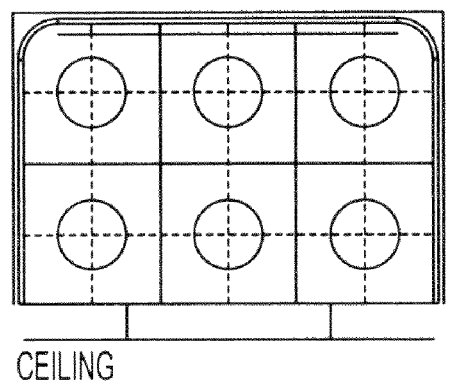
CEILING
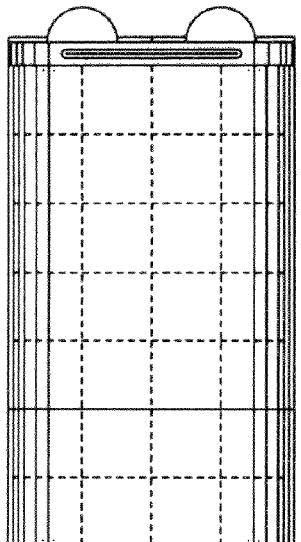
SIDE ELEV
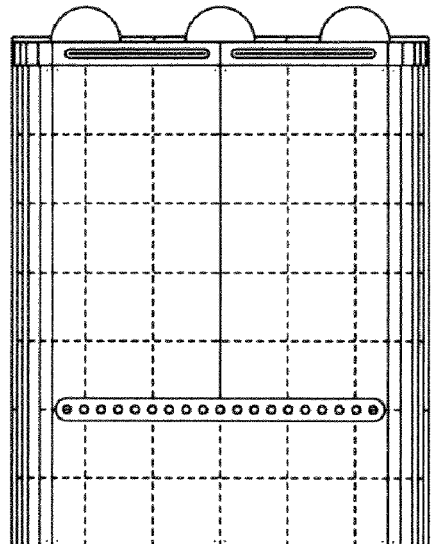
ELEVATION
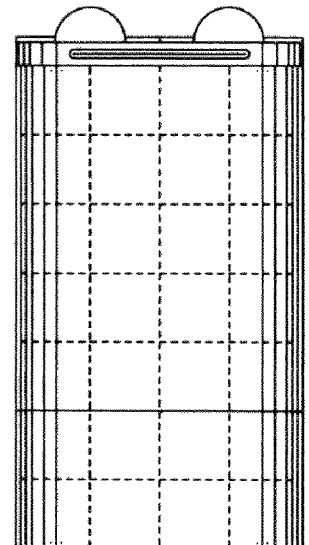
SIDE ELEV
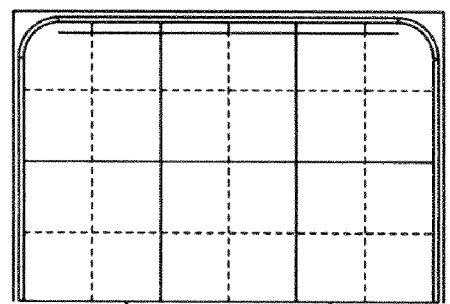
PLAN
NATIONAL ELEVATOR
SCHEME R-5
FIG. 16e

FIG. 17a

General Notes:

1. Size of new panels will be engineered by NECD to fit within the existing elevator car enclosure dimensions.
2. All materials utilized will be in strict accordance with ANSI / ASTME Code requirements.
3. Estimated Addition Weight of Cab: 275 lbs Note: Additional weight above is calculated by the total cumulative weight of new cab components being provided less any materials being removed by NECD from existing cab interior. It does not include calculations for any equipment not being supplied or installed by NECD.

Note: Inside car dimensions may be reduced up to 1 1/2" in depth and 1 3/4" in width based on existing conditions of elevator cab enclosure.

New Clear Height Inside Car:

Customer Responsibilities:

| | |
|---|---|
| | All necessary permits required as well as any filing fees. |
| | Removal / reinstallation of car doors or elevator fixtures required. |
| | Balancing of elevator for new cab weight. |
| | Any engineering information required from others (ie. car door equipment templates, fixture templates, etc.) |
| | Deposit payment with approval as per contract. |

THIS FORM AND RENDERING ARE THE PROPERTY OF NATIONAL ELEVATOR CAB AND DOOR CORP AND MAY NOT BE REPRODUCED WITHOUT WRITTEN PERMISSION

FIG. 17b

SYSTEM AND METHOD FOR DESIGNING ELEVATOR CAB AND LOBBY INTERIORS

This application is a Continuation-in-Part of parent application Ser. No. 11/384,606 filed on Mar. 20, 2006 entitled 'Design Method for Lobby and Common Area Interior' now issued as U.S. Pat. No. 7,035,329 which is a Continuation-in-Part of parent application Ser. No. 10/294,026 filed on Nov. 14, 2002 entitled 'Design Method for Elevator Cab Interior', now issued as U.S. Pat. No. 7,016,817.

FIELD OF INVENTION

The present invention relates to building construction and more particularly to an advantageous method of and system for designing and constructing an attractive elevator interior, lobby or other public area at a reduced cost. This design method reduces the burden, time commitment and cost of designing, manufacturing and installing a custom designed lobby.

BACKGROUND OF THE INVENTION

Traditional Methods of Elevator Interior and Lobby Design

Traditionally, there are three methods by which an elevator interior or lobby design is chosen. The method of selection is usually determined by the quality of the building: Rated from A down to C as illustrated below:

|  | "A" Building | "B" Building | "C" or Lesser |
|---|---|---|---|
| 1) Repair and refinish an existing Installation (existing buildings only) |  | 40% | 75% |
| 2) "Make it look like that building" (existing or new buildings) |  | 40% | 25% |
| 3) Hire an architect to create a new design (existing or new buildings) | 100% | 20% |  |

The first method of repairing and refinishing an existing installation is usually the lowest cost because most of the existing material is retained and little or no engineering and/or structural modifications are required. An architect or designer may be used to supply specifications and provide oversight of the project, but by definition there is little or no change in either the design or material. The major disadvantage of this method is that an existing design that is carried forward may contain many flaws, such as the design being in conflict with the other major public spaces in the building, the exterior or neighborhood, being dated or otherwise unattractive to a wide range of existing or potential tenants, or being expensive to maintain. Although this method may represent the simplest, fastest and least expensive method of updating a building's appearance, it often adds the least amount of value to the property and does the least to retain and attract tenants.

The primary advantage of the second method, to replicate an existing design, is that the design and cost will be fairly well known before the contract is put out to bid. This method is frequently used by property owners or managers who have purchased existing buildings or plan to construct new ones and who wish to maximize brand equity by using common design elements across their portfolio of properties. Even though an architect, engineer or designer is used to create the drawings and specifications, there are many opportunities for the buyer to get poor value for the money spent. For instance, if the original to be copied is poorly designed, the copy will be no better and may be quite expensive. Secondly, differences in the underlying space, such as dimensions and structural capacities may add additional cost to a project without enhancing the space. Finally, copying a design from one property to another may sometimes be inappropriate to the existing design elements of the building and its environs.

The third method, creating a custom design, may be the most effective way of enhancing the attractiveness of a building. As with the second method, an architect, engineer or designer is used to create the drawings and specifications. However, in this case, the architect or designer has greater flexibility in choosing both the design elements and materials for the space. This flexibility allows the designer the best chance of choosing an attractive design that is most suitable to the rest of the building and its environs. This attractive design is also useful in retaining and attracting new tenants.

There are serious drawbacks to using a custom designed elevator interior or lobby. For instance, the process can be very time consuming. At the outset, the owner and the designer may have completely different aesthetic and design visions for the project, a situation that is less likely to occur in the first and second methods discussed above. Without extensive, painstaking coordination, the designer's proposal may have design elements unacceptable to the project owner. Another problem is that although the designer is given a budget, there is no way to measure if the design is within the budget until most of the drawings and specifications are created and submitted to the suppliers for bids. The bids frequently come back above the budget and one or more modifications of the design and specifications may be necessary to get the project within the budget. Even if the project is within the budget, a large part of that budget may be consumed by engineering and procurement costs, rather than the purchase and delivery of the actual product. Additional time is needed with custom designs because of the necessity for suppliers to produce custom drawings and samples for approval and for custom materials to the jobsite.

SUMMARY OF THE INVENTION

Applicant proposes to change the way elevator interiors, lobbies and other public spaces within a building are designed by providing a series of designs of high architectural quality, readily available premium materials and pre-engineered to reduce the cost and lead time.

Applicant's advantageous design method provides for the selection of attractive designs for elevator interiors and lobbies for commercial, residential and institutional buildings. Applicant supplies the engineering and manufacturing expertise to guide the architectural design decisions and material selection that minimize the cost of material and labor neither of which directly contribute to the appearance and structural integrity of the elevator interior or lobby.

Applicant's method allows controlling the product cost by choosing from a materials palette of high-end products such as glass, stone, wood and textured metals in a limited range. These materials have been selected for their attractive appearance, reasonable cost and availability, thus maximizing the buying power for acquiring these materials at the lowest cost.

Building owners will save money by getting a product that costs as much as 25% less than lobbies constructed of similar materials and design would cost. They will be given the advantage of having a superior product enhancing the appearance of their buildings that will allow them to rent space more quickly and at higher prices.

With a limited palette of materials and photo-realistic renderings of elevator interior or lobby designs, the time-consuming project management of coordinating drawings, samples and mockups between the project owner, designer and contactor is reduced dramatically. Standard pricing and industry discounts will minimize unforeseen extras and insure a profit margin. The lead time for the elevator interior or lobby construction or refitting can be accurately predicted and will be less than projects that do not use this system of ease of selection and manufacturing standardization.

Independent architects and designers take on financial risks in custom elevator interior or lobby design projects because of the technical complexity and lengthy approval process. Now an architect or designer will be able to work together with the project owners and contractors from the start of a project in a coordinated and collaborative process, rather than having to work independently and lose time and money.

It is an object of the invention to provide a method of interior design to provide a selection of available materials for selection in a predetermined design. It is an object of the inventive method to provide the benefit of the ability to closely match existing architectural elements. It is a further object of the inventive method to provide the benefit of the ability to closely match cost criteria. It is a further object of the inventive method to provide the benefit of the ability to closely match existing materials and to determine whether existing materials are compatible with replacement materials.

In addition, the new method provides a new financing tool by an operating lease. In launching this product method, Applicant has found creative ways to maximize sales volume. One new area of interest is to change the transaction for the end user from a large lump-sum capital investment into an affordable and predictable expense. By offering construction and refitting of elevator interiors and lobbies through an operating lease, Applicant believes that there will be a three-fold benefit to the business:

1. Expanding the base of potential customers by reducing the cost and creating an attractive quality product available to building owners who lack the liquidity to pay for all this work at once.
2. Increasing the market share within this base by providing a unique alternative that may present substantial savings to the customer.
3. Raise the average selling price as customers trade up to more attractive designs and materials, because of the ability to spread the cost over time.

This invention discloses a method for drastically reducing the burden, time commitment and cost for designing, manufacturing, refitting and installing an elevator interior, building lobby or other public space. This method provides a way to upgrade the quality of the elevator interior or lobby materials, design and craftsmanship and at the same time reduce the costs of manufacturing and installing the elevator interior or lobby by as much as 33%. Real estate developers, building owners, architects and contractors can save time and money by ordering a customized elevator interior or lobby that can be viewed in advance and supplied sooner than by other methods.

The design method criteria takes into consideration the need for utilizing premium materials for the walls and ceiling without adding weight that the existing structural elements of the building cannot handle. This method provides a solution for an elevator interior or lobby that is 1) Innovative, 2) Custom made, 3) Time saving, 4) Easy to specify, 5) Easy to price and 6) Easy to install.

Materials to be chosen include stone, wood, glass and woven wire mesh. These materials can be used in hundreds of different combinations. Furthermore, using these materials allows the designer to complement any commercial, institutional or residential building's intrinsic design. Also, this method allows the incorporation of existing or upgrades of elevator interior or lobby materials. This method provides affordability without compromising quality.

The cost of the average elevator interior or lobby using Applicant's design can be 30% less compared to a custom design using the same materials palette. In addition, the design incorporates a lighter weight construction so that expensive structural design modifications to the building required by excess weight are eliminated.

This advantageous method of elevator interior or lobby design provides an attractive appearance complementary to other elements of the building in which the elevator interior or lobby is installed, such as the exterior, other existing public spaces and/or elevator cabs. The building is evaluated for the selection of one or more options of elevator interior or lobby design incorporating budget, design elements and materials. A suitable design is selected from a Series of previously prepared design proposals. Finally, decorative materials for the elevator interior or lobby are selected from a palette of previously prepared options including selection of material type, color and design. The palette options include wood, metal mesh, stone and glass and the materials shown for selection from the palette include rectangular panel tiles. The materials shown for selection from the palette for a decorative wall which can extend from floor to ceiling in height of a lobby or elevator interior. The material for the other walls of the elevator interior or lobby is preferably selected from rectangular panel tiles with decorative surfaces of the same design and color.

The method of elevator interior or lobby design includes providing the expertise of an experienced designer for selecting a suitable design from a Series of design proposals for said building and providing the expertise of an experienced designer for selecting the material for the decoration of the lobby from a palette of options for available material type and color.

This method of elevator interior or lobby design includes providing expertise in elevator interior or lobby design architecture, decoration, and mechanical construction. The expertise is used to evaluate a building for determination of an appropriate elevator interior or lobby design. The expertise is used to select a suitable design from a Series of previously prepared design proposal. The expertise is then used for selecting the material for the decoration of the elevator interior or lobby from a palette of options for available material type and color. This expertise is then used to construct an elevator interior or lobby interior in accordance with the design and material selected.

BRIEF DESCRIPTION OF THE DRAWINGS

FIG. 1 illustrates an embodiment of a design report according to the invention.

FIG. 16a to 16e illustrate further design schemes that may be selected as the desired architecture and appearance.

FIG. 17 illustrates an example of a design report with non-optional, and selected optional and selected elements for a particular design designation.

DETAILED DESCRIPTION OF THE INVENTION

A method and system of interior design according to the invention includes providing a choice of architectural designs among a selection of predetermined architectural designs. The method and system can include providing a choice of elevator interior designs among a selection of predetermined elevator interior designs. Alternatively, the method and system can include providing a choice of lobby designs or other interior spaces among a selection of predetermined lobby designs or interior space designs. The method and system can also include providing a computer interface 10 programmed to perform the functions of the inventive method, including displaying options and for providing a choice of designs, including an interface that can be accessed over the Internet.

Figure 2:
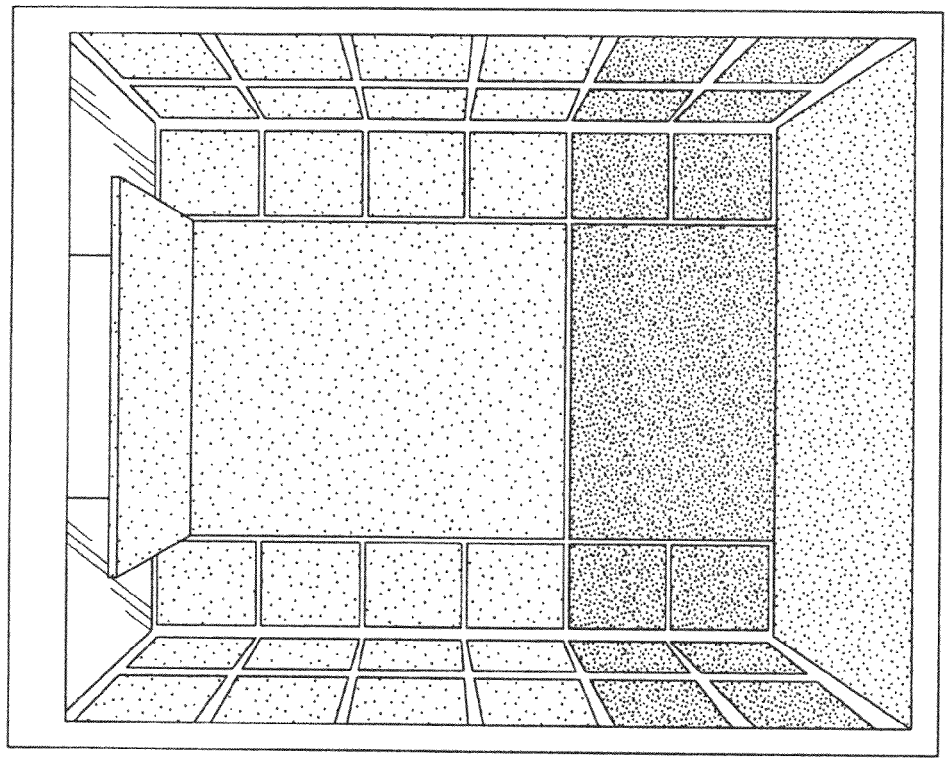
FIG. 2 illustrates an embodiment of an optional elements display according to the invention.

The computer interface 10 can be used to designate which design elements are included in the design, and to provide specific information related to the project. The computer interface can be programmed to input and display information related to the design on a design report 100, as shown in FIG. 1. In addition, the computer interface can be programmed to display a mock image 160 of the elevator cab or lobby interior incorporating the design elements 110, as shown in FIG. 2.

Figure 17A:
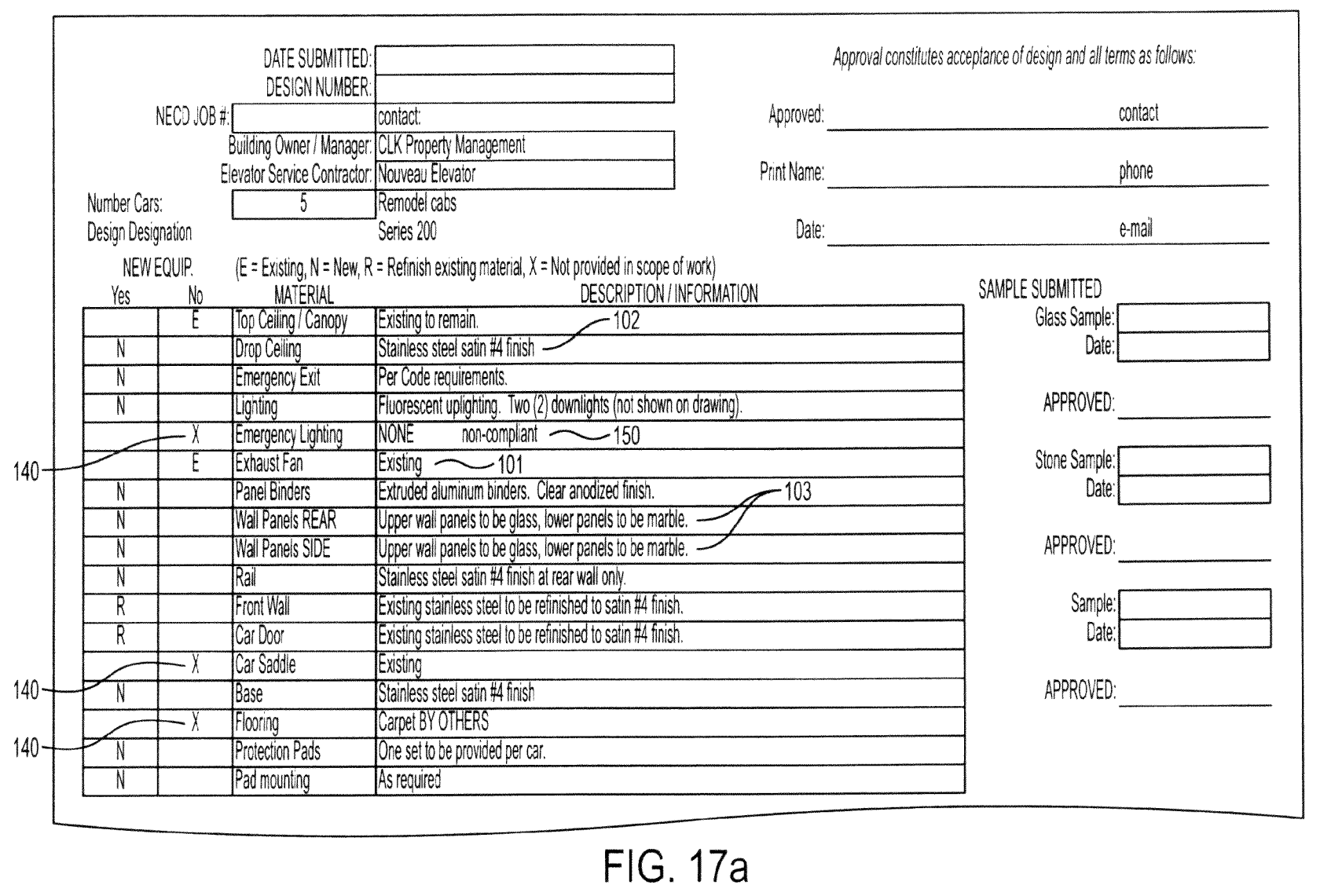

Each of the predetermined architectural designs have design elements 110 including optional elements, non-optional elements, and selectable elements depending upon each of the predetermined architectural designs. For example, in one embodiment having at least one predetermined architectural design for an elevator cab, the design elements 110 can include top ceiling/canopy, drop ceiling, lighting, emergency lighting, exhaust fan, panel binders, wall panels rear, wall panels side, rail, front wall, car door, car door, car saddle, base, flooring, protective pads, and pad mounting, among other things. As an example, a design report can have a number of non-optional, and selected optional and selected elements included in the design report for a particular design designation, such as is shown in FIG. 17.

The computer interface can complete other aspects of the design report, including, design parameters 104, project requirements 105, approval information 120, project schedule information 130, material availability information 140, and compliance information 150, among other things.

Figure 12:
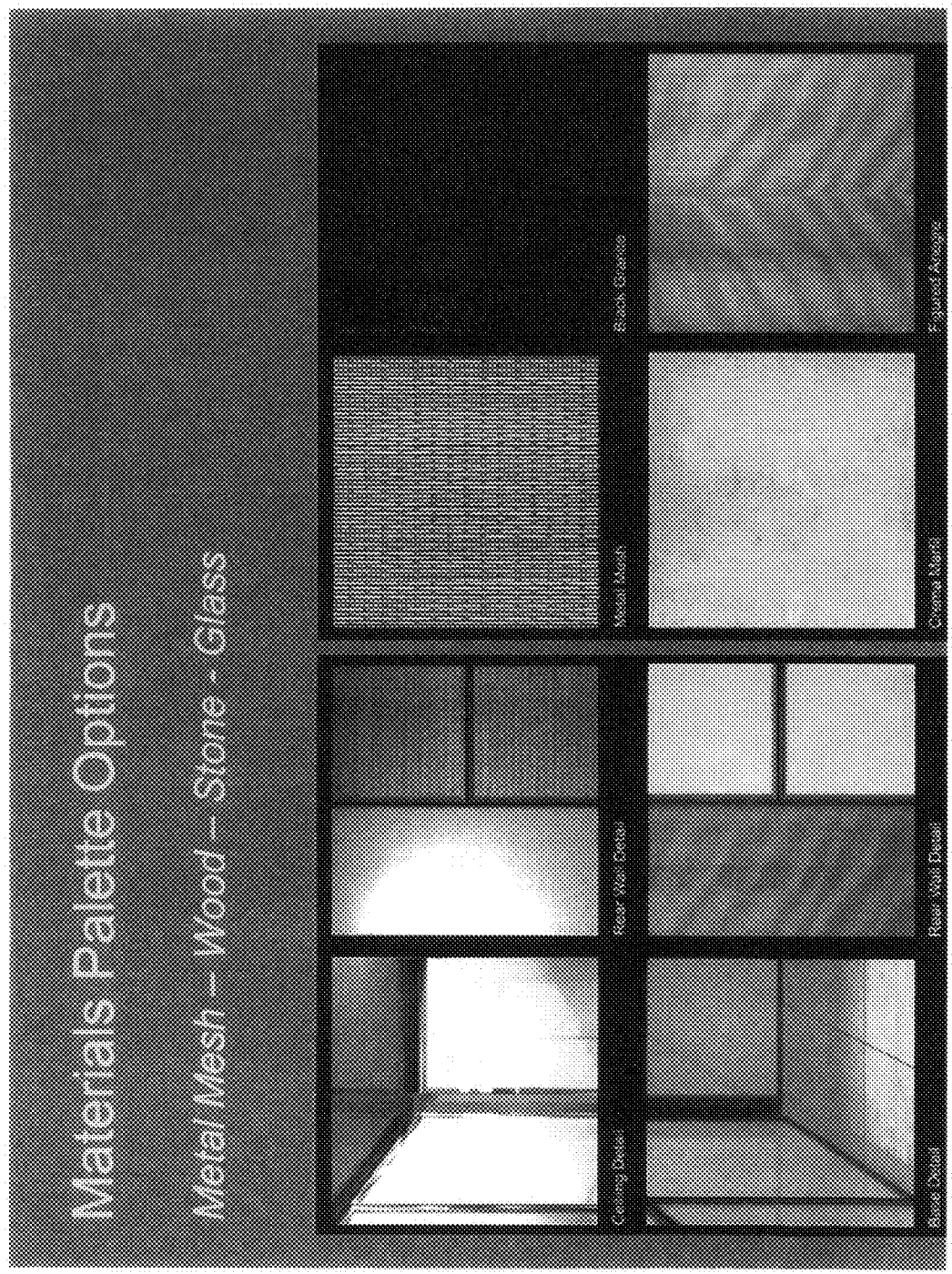
FIG. 12 illustrates a Materials Palette Options Selection display.

The computer interface 10 can be programmed to provide a user with choices available for a user to designate for each design element provided in a specific design selected for the project. For example, a list box can be provided, or the user can be prompted to view a materials options display, as shown in FIG. 2 and/or a Materials Palette Options Section display, as shown in FIG. 12.

Each of the optional elements can be optionally selected for inclusion in the design, such as by using the computer interface 10. For example, an optional element can be a rail, which can be optionally selected for inclusion into the design. The optional element can be excluded from the design and can be described as "Not provided in scope of work."

In addition, or in the alternative, design elements can be designated as "New", "Existing" or "Refinish Existing Material" among other things. Accordingly, where an element is designated as "Existing," then the design can reflect that information. For example, when an element is designated as "Existing" it may not require additional cost, weight or time to complete the project. In addition, if a requested material is unavailable, the design report can provide availability information 140.

Figure 13:
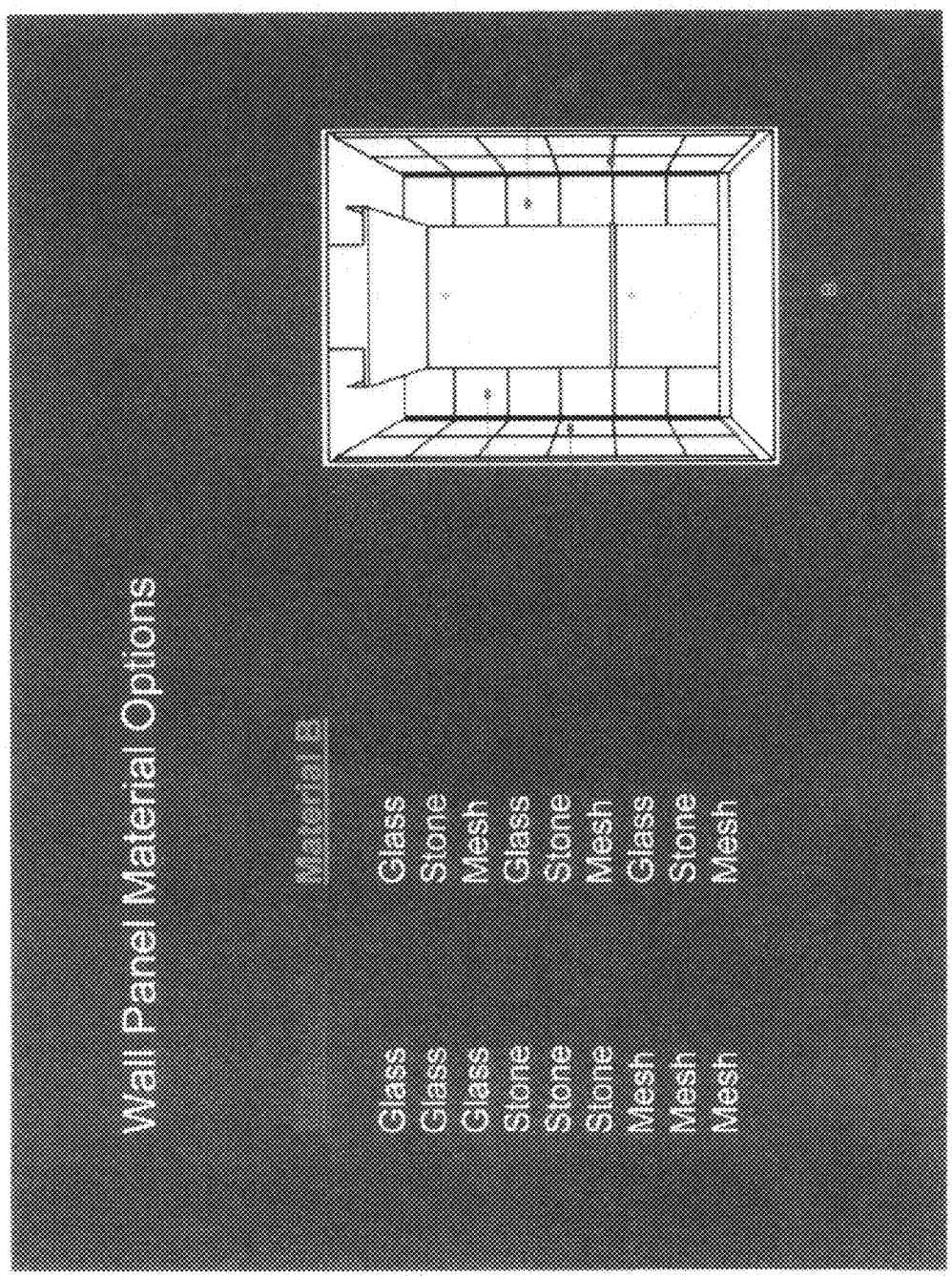
FIG. 13 illustrates a Wall Panel Material Options Guide.

Each of the selectable elements can be a selection of more than one element, at least one of which can be selected for inclusion in the design. For example, a selectable element can be a designation of a material for a rear wall panel, as described more fully below. Materials for each element can be chosen from materials appropriate for that particular element. For example, materials for a rear wall can be selected from the group of glass, stone, mesh metal, or wood among other things. Selectable elements can include other details as well, such as finishing. For example, a material of "stainless steel" can be selected for the "base" element among other materials, and a number of finishes can be provided, including "satin #4 finish." Materials can be selected from an optional elements display, such as shown in FIG. 2, or from a Materials Palette Options Selection Display, such as shown in FIG. 12. Materials can be assigned to a particular project using a Wall Panel Material Options Guide, such as shown in FIG. 13.

The optional elements, non-optional elements, and selectable elements can provide the necessary components for designing the elevator interior or lobby according to each of the predetermined architectural design. A user can provide information relating to a desired design and all or a part of the information FIG. 1 shows an embodiment of a computer interface 10 displaying a design report 100 for a selected architectural design, including design elements 110 associated with the selected architectural design. The step of providing a computer interface 100 can include displaying design parameters 104, project requirements, and approval information 120.

The method and system includes providing a computer interface 10 having an interactive interface whereby a user can select optional design elements 101 and at least one of a choice of selectable elements 103. The design report 100 can display the selected optional design elements 101, at least one of the selectable elements 103 chosen by the user, and any non-optional elements 101 associated with the selected architectural design.

The method and system of interior design according to the invention includes determining design parameters 104 based upon the selected optional elements, non-optional elements, and selectable elements which have been selected for inclusion in the design. Design parameters can include dimensions, weight, and cost, among other things. The design parameters can be displayed on the design report 100.

The method and system of interior design according to the invention can also include determining project time information 130 based upon the selected optional elements, non-optional elements, and selectable elements which have been selected for inclusion in the design. The project time information 130 can be displayed on the design report 100. Project time information 130 can reflect time estimates for completion of various tasks input by a user.

The method and system of interior design according to the invention can include determining availability of selected optional elements, non-optional elements, and selectable elements which have been selected for inclusion in the design. The availability information 140 can be displayed on the design report 100.

The method of interior design according to the invention can include determining compliance of selected optional elements, non-optional elements, and selectable elements with project requirements. Project requirements 105 can include whether a sample of the selected optional elements, non-optional elements, or selectable elements which have been selected for inclusion in the design have been approved for inclusion in the design, such as can be provided by approval information 120. In addition, project requirement 105 can provide other information to the user, such as whether removal of elevator car doors may be required. Project requirements 105 can also include whether the selected optional elements, non-optional elements, and selectable elements conform with bidding parameters, local regulations such as building codes, any necessary permits required, as well as any filing fees among other things. Project requirements 105 can also include whether or not elevator cab doors or fixtures should be removed or installed in accordance with a chosen project design for an elevator interior design. Project requirements 105 can also include whether or not the chosen project design for an elevator interior design indicates that the elevator should be rebalanced to account for a new elevator cab weight. In addition, project requirements 105 can also include whether or not any additional engineering or other information may be required. Project requirements 105 can also include whether or not payments, such as deposit payments have been made with approval in accordance with the project contract. The project requirements information 105 can be displayed on the design report 100.

As elements are selected by a user for a particular design and information is provided to complete a particular design report 100, the information in the design report, such as cost, weight and project time can be updated to reflect current information.

The computer interface 10 can be programmed for the design report 100 to be used as an order sheet designating materials and work requested for a particular project. The design report 100 can be used to submit the order sheet as a request to a provider of materials and services related to the design for provide the materials and/or perform the services of installing the materials for the design.

The computer interface can be programmed to incorporate a optional elements display, such as shown in FIG. 2, for selecting materials in the design report 100. For example, by selecting an area of the design report 100 where materials can be specified in the description of a design element, a user can be prompted to access the optional elements display.

In addition, or in the alternative, the computer interface can be programmed to incorporate a Materials Palette Options Section display, such as shown in FIG. 12, for selecting materials in the design report 100. For example, by selecting an area of the design report 100 where materials can be specified in the description of a design element, a user can be prompted to access the Materials Palette Options Section display.

In addition, the computer interface can be programmed to incorporate a Wall Panel Material Options Guide, such as shown in FIG. 13, for determining which selected materials can be used in elements associated with a particular design in the design report 100. For example, by selecting an area of the design report 100 where a particular design is specified, a user can be prompted to access the Wall Panel Material Options Guide.

Examples of designs for use in system and method are described generally below, and are not intended to limit the scope of designs used in the system and method.

Three Interior Designs

There are three basic designs to select from which can be used in elevator cab interiors, lobby designs and other such interior spaces:
1. Series 200.
2. Series 300
3. Series 400

The Series 200

This design exhibits a center feature wall panel which aligns with a bi-level ceiling featuring both direct and indirect lighting. Complementary wall panels can be included complete the elegant design. FIG. 3 to 9 of the drawings illustrates the method shown for Series 200.

The Series 300

Figure 10:
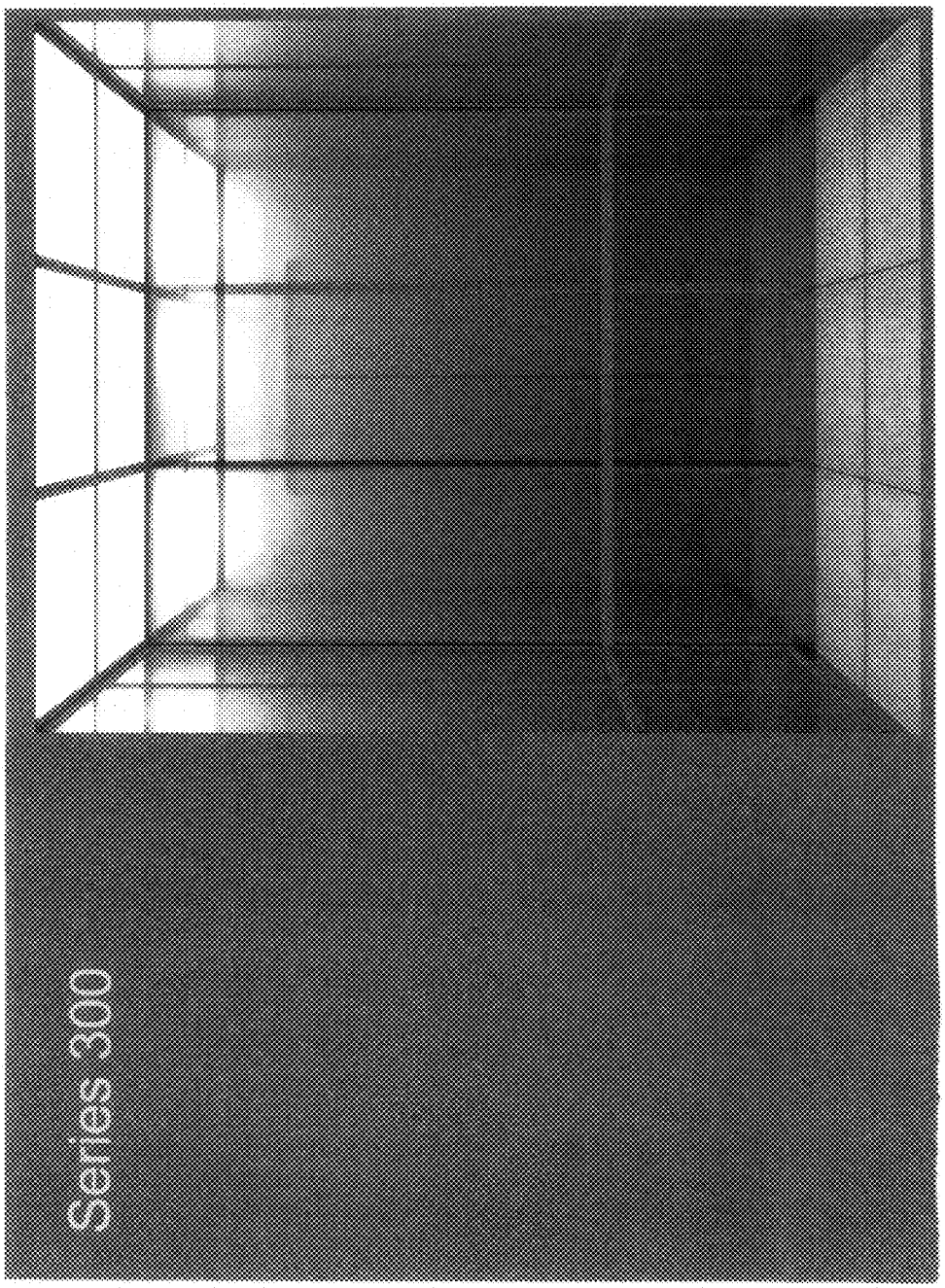
FIG. 10 is a perspective view that illustrates a Series 300 interior design where three large upper back panels are used for a portion of a first wall area, and three smaller lower panels are provided for panels of other wall areas.

This paneled lobby wall features a traditional wainscot with the upper panels in either identical or complementary materials. A suspended ceiling can be provided which is luminescent and segmented to align with the walls. FIG. 10 illustrates the Series 300 method.

The Series 400

Figure 11:
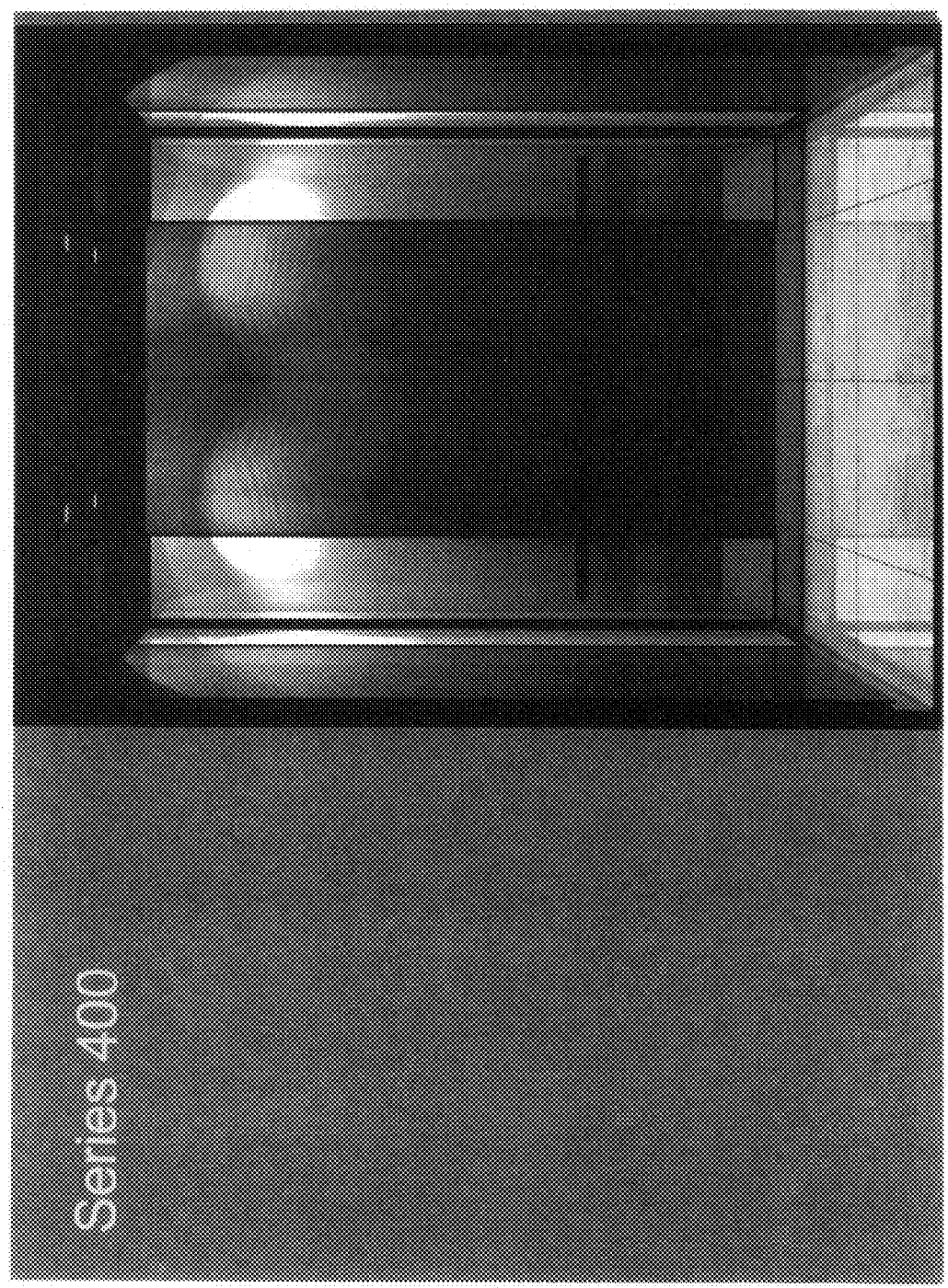
FIG. 11 is a perspective view that illustrates a Series 400 interior design where large wood design wall panels and large wood side wall panels are provided extending from floor to ceiling.

This unique wall design is carried into a suspended ceiling. The center of the wall features segmented panels of complementary materials. The top of the wall panels are designed by an elegant metal grill. The lobby can be lit by halogen downlights mounted on a suspended ceiling. FIG. 11 illustrates the design method for Series 400.

The Design

By utilizing pre-existing designs, the property owner reduces the design phase by eliminating the need for concept drawings, models and design review. This savings translates not only into shorter time frames, but fewer design hours and lower costs. Users, such as contractors and building owners, can benefit by participating in the selection and specification of designs because an object of the invention is to provide a transparent and easy method of choosing designs.

The Selection/Purchase Process

A simplified ordering process will yield a quotation in a matter of hours. A full color presentation can be available within one week.

| WALL PANEL MATERIAL OPTIONS | |
|---|---|
| Material A | Material B |
| Glass | Glass |
| Glass | Stone |
| Glass | Mesh |
| Stone | Glass |
| Stone | Stone |
| Stone | Mesh |
| Mesh | Glass |
| Mesh | Stone |
| Mesh | Mesh |

FIG. 10 illustrates the options for the selection of these materials.

Figure 3:
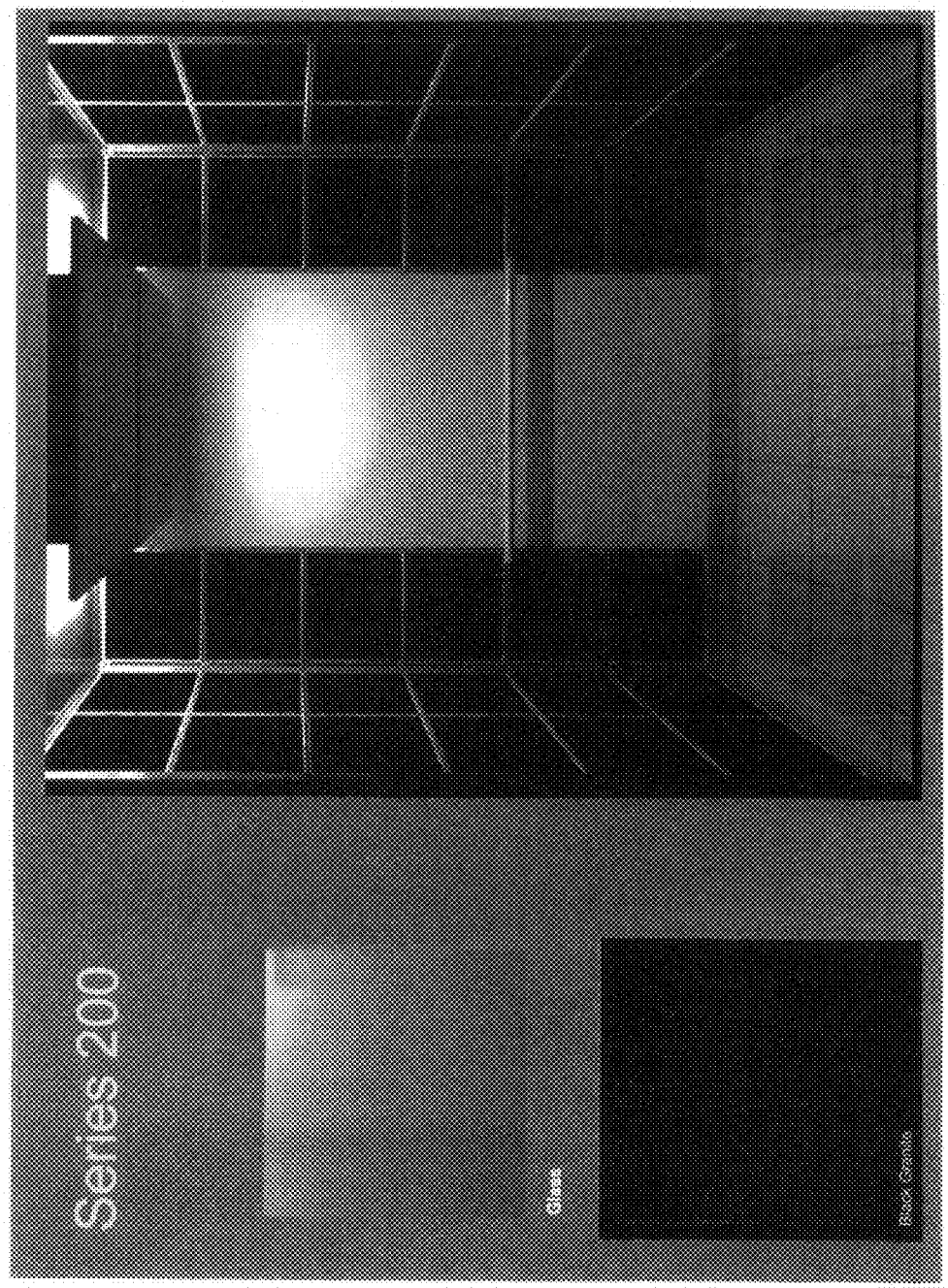
FIG. 3 is a perspective view that illustrates a Series 200 interior design where glass is used for a portion of a first wall area, and black granite is provided for panels of other wall areas.

As shown in FIG. 3, the 200 Series design includes an interior wall panel for the lobby material. This panel extends from floor to ceiling. On either side of the wall panel are six (6) square panel tile vertical rows that run from floor to ceiling to complete the decoration of the wall. The vertical rows of panel tiles extend along the width of the walls of the lobby. As shown in FIG. 3 the wall panel is made up of glass panels and square panel tiles of black granite.

Figure 4:
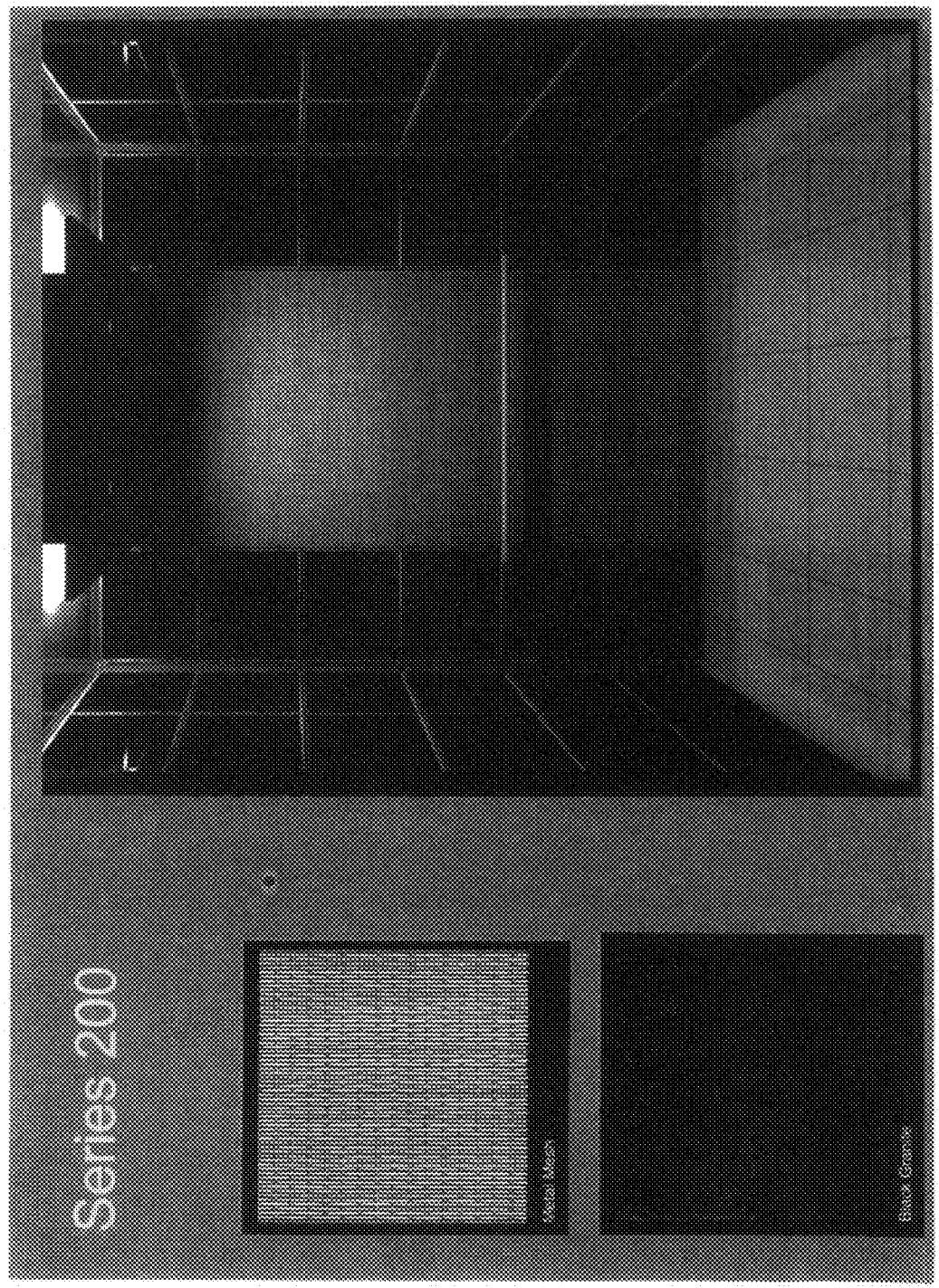
FIG. 4 is a perspective view that illustrates Series 200 interior design where metal mesh is used for a portion of a first wall area, and black granite material tiles are provided for panels of other wall areas.

In FIG. 4 there is another decorative design scheme for Series 200 with different material which can be selected from the Materials Palette Options display, such as shown in FIG. 12. Here the wall panel is made of metal mesh and the side panel tiles are made of black granite.

Figure 5:
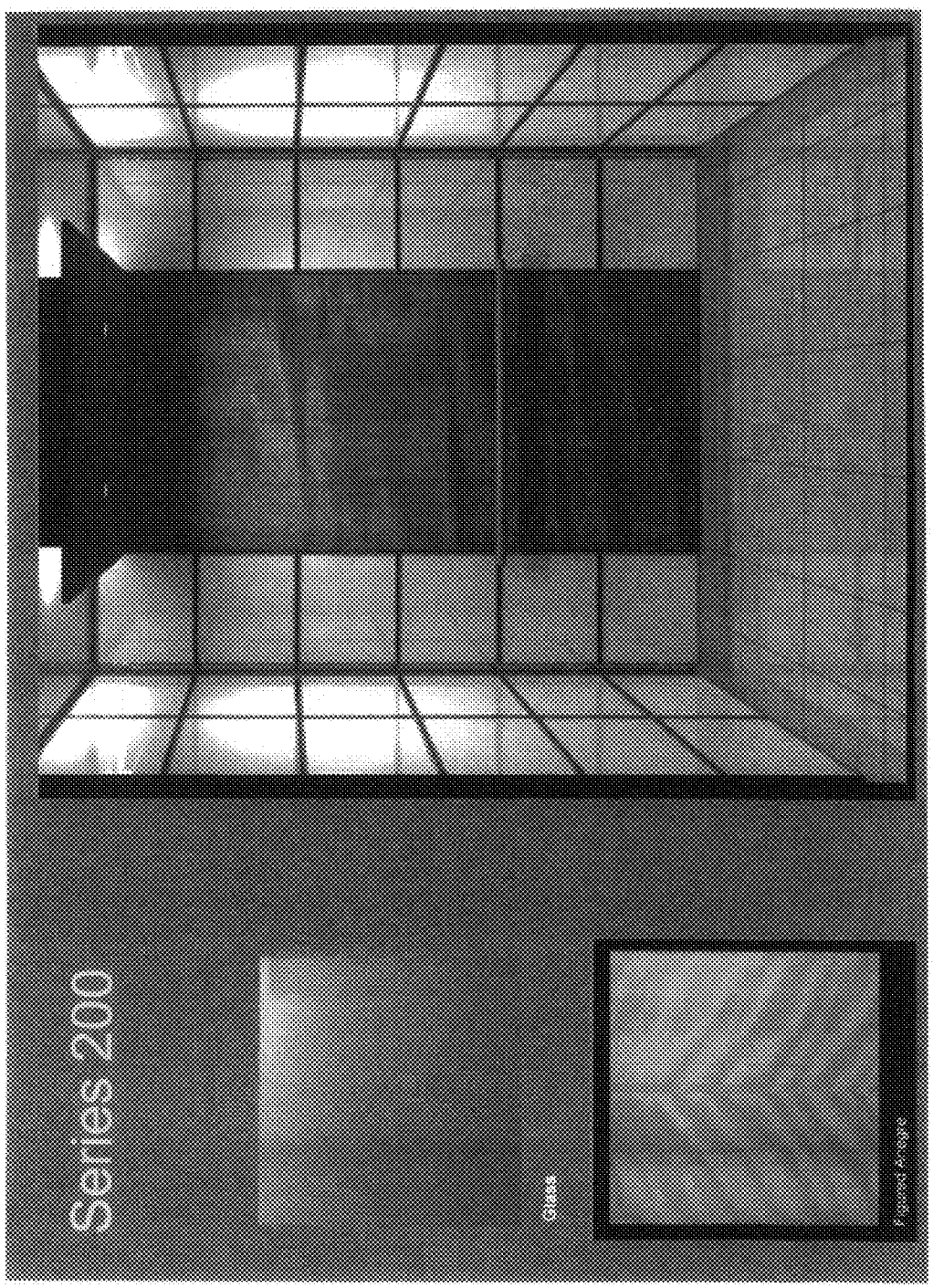
FIG. 5 is a perspective view that illustrates a Series 200 interior design where Figured Anegre wood design is used for a portion of a first wall area, and glass material panel tiles are provided for panels of other wall areas.

In FIG. 5, the Series 200 design with a wall panel made of Figured Anegre wood design and tile panels made of glass have been selected from the Materials Palette Options of FIG. 12.

Figure 6:
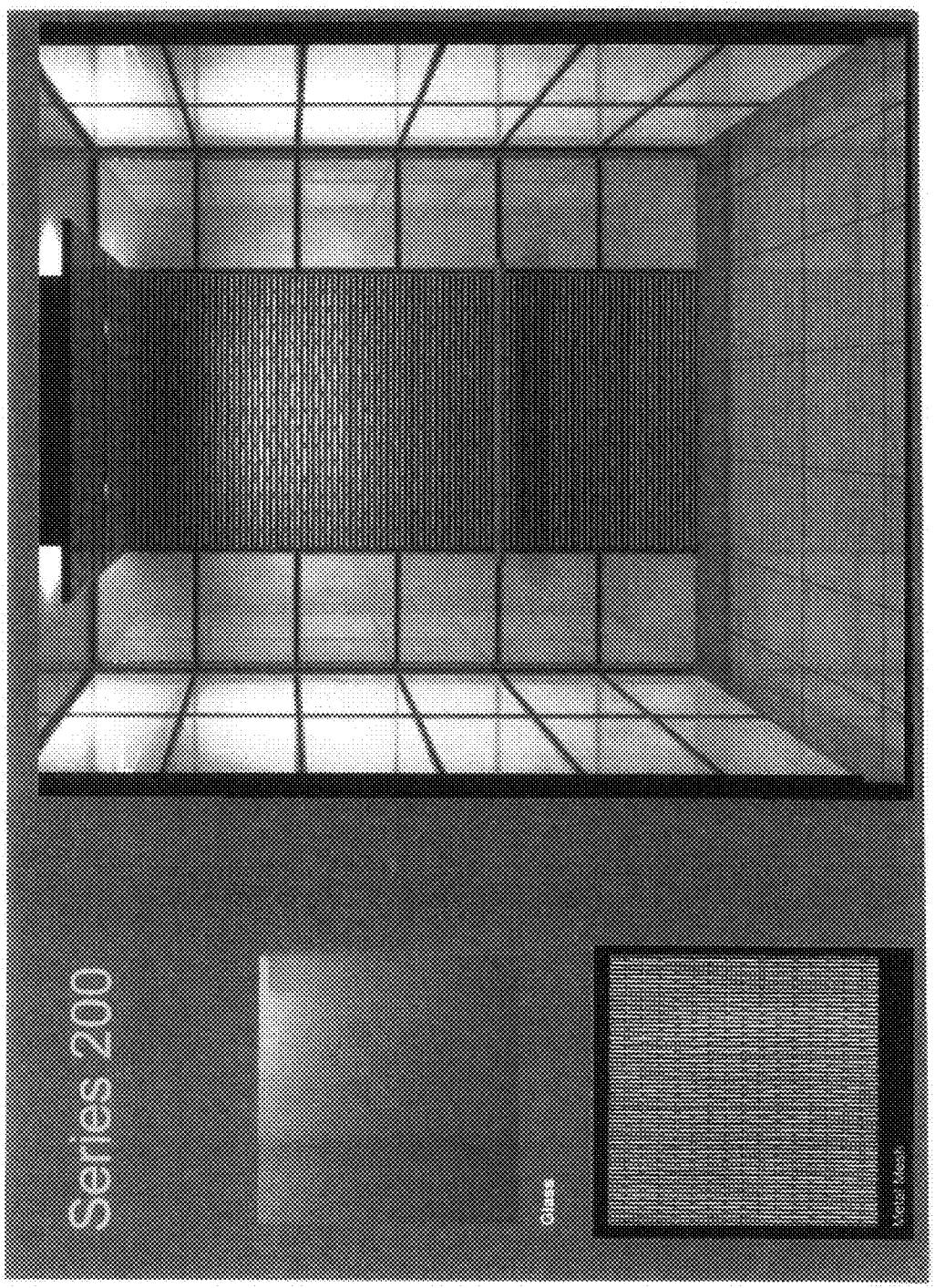
FIG. 6 is a perspective view that illustrates a Series 200 interior design where metal mesh is used for a portion of a first wall area, and glass rectangular panel tiles are provided for panels of other wall areas.

FIG. 6 is a Series 200 design with a wall made of metal mesh. The panel tiles are made of glass.

Figure 7:
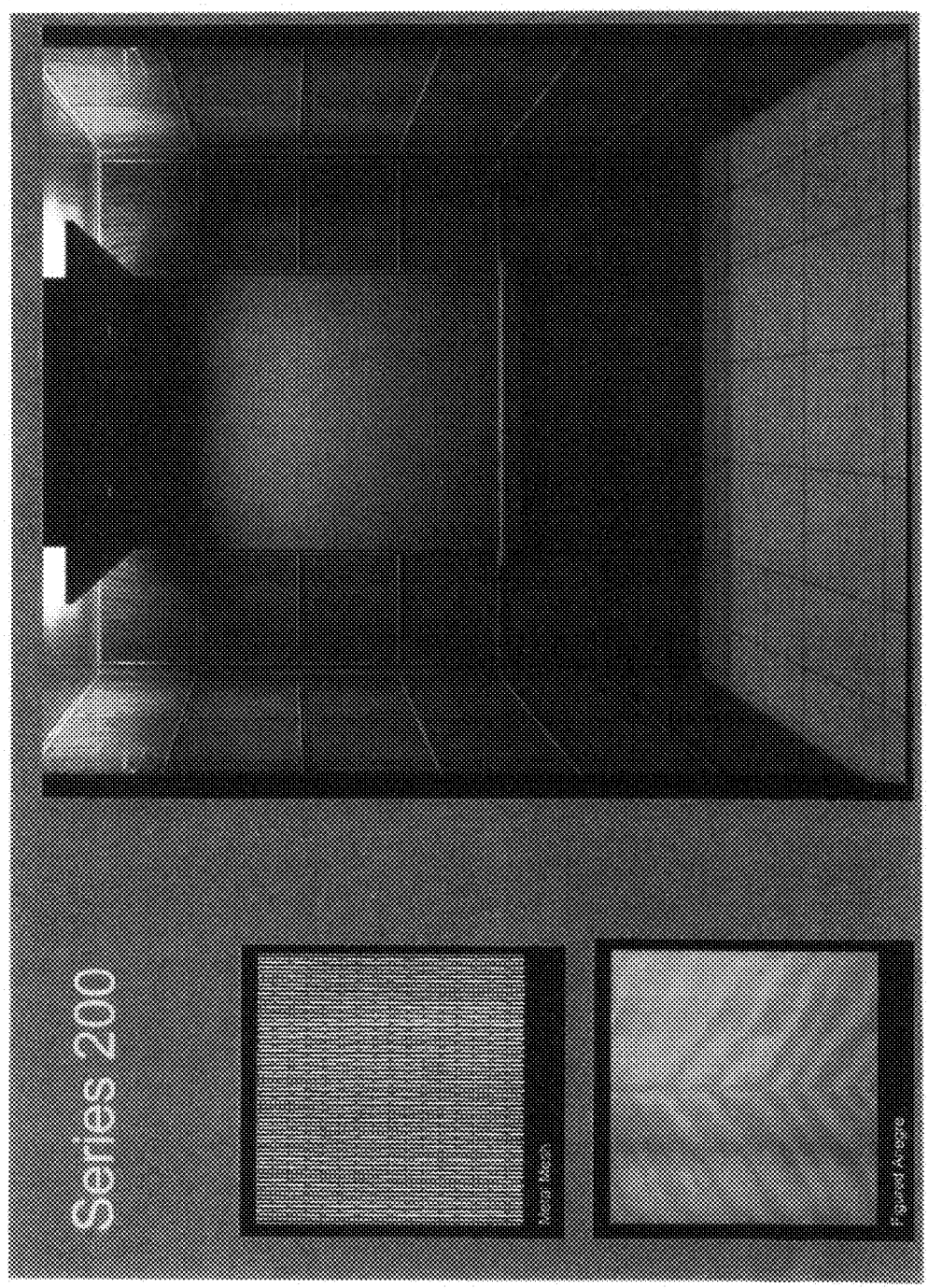
FIG. 7 is a perspective view that illustrates a Series 200 interior design where metal mesh is used for a portion of a first wall area, and Figures Anegre wood design is provided for panels of other wall areas.
Figure 8:
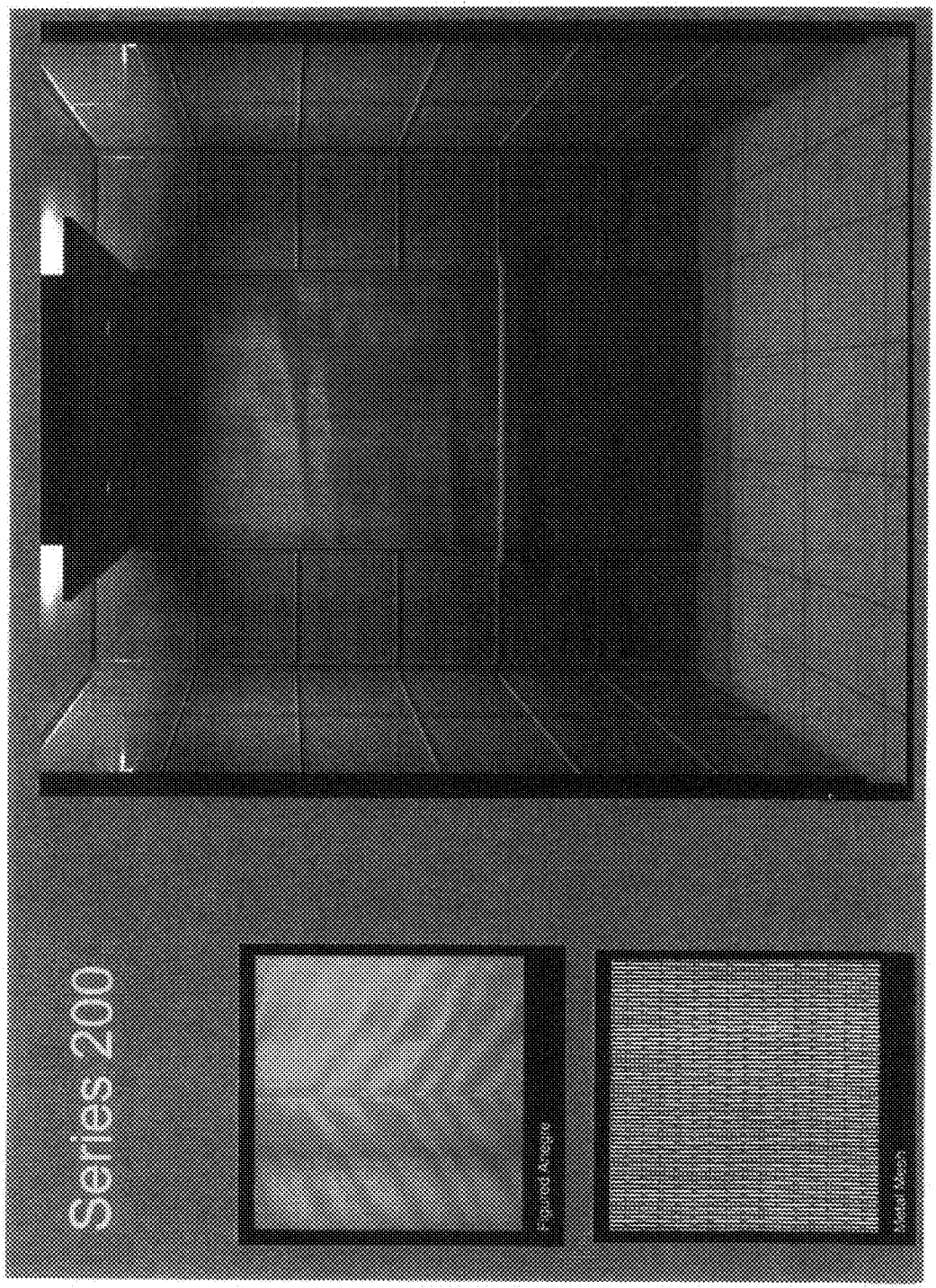
FIG. 8 is a perspective view that illustrates a Series 200 interior design where Figured Anegre wood is used for a portion of a first wall area, and rectangular panel tiles of metal mesh are provided for panels of other wall areas.

Similarly FIG. 7 is a Series 200 design with a metal mesh wall and with the square panel tiles made of figured Anegre wood design. In contrast, FIG. 8 discloses a Series 200 design with a wall made of Figured Anegre wood design and the square panel tiles of metal mesh.

Figure 9:
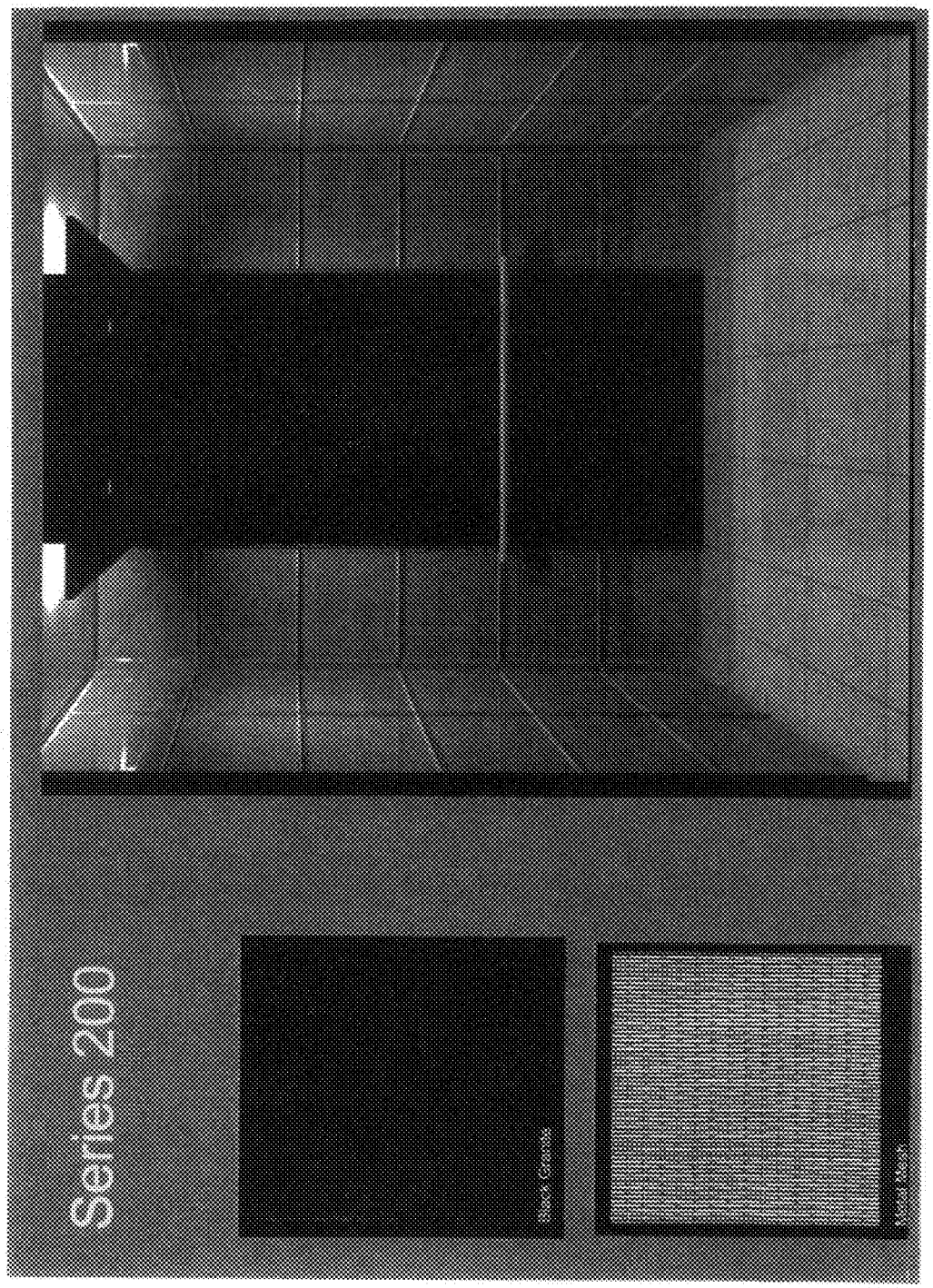
FIG. 9 is a perspective view that illustrates a Series 200 interior design where black granite is used for a portion of a first wall area, and rectangular panel tiles of metal mesh are provided for panels of other wall areas.

Another variation of a Series 200 design is shown in FIG. 9 which illustrates a design with black granite wall and metal mesh square tile material.

FIG. 10 is a perspective view that discloses a Series 300 lobby wall with a six (6) wall panel having upper three rectangular panels which extend from the ceiling to approximately ⅔ down from the height of the wall and three square lower panels that extend from the floor to the upper panels. A mullin separates the upper and lower panels. The panels are made of glass.

FIG. 11 is a perspective view of a series 400 lobby design with large vertical wooden panels on the wall. On either side of the wall panels are elongated end panels which may be made of mirror or glass extending from floor to ceiling. There is a hand railing located on the wall.

FIG. 12 illustrates a Material Palette Options display where the user can select a material such as wood, metal mesh, stone and glass panel for use in one of the previously selected designs. FIG. 12 also shows the lobby wall detail and lobby ceiling and base construction detail that can be selected as an option with a selected design.

FIG. 13 shows the wall panel material option chart showing various materials that can be used for the 200 series such as glass, stone, metal mesh and wood.

Figure 14:
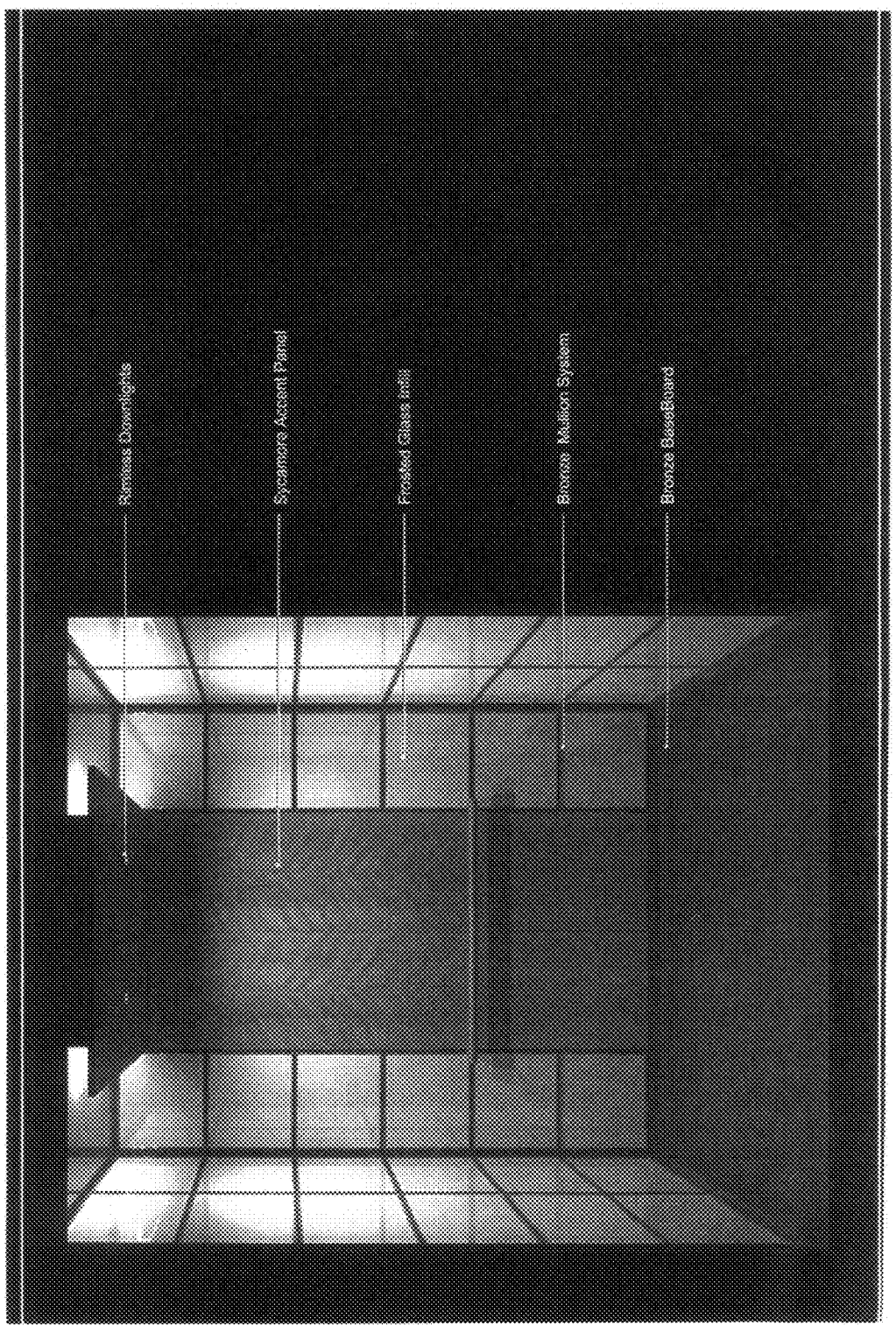
FIG. 14 is a perspective view that illustrates another Series L200 design which includes a bronze mullion and baseboard.

FIG. 14 discloses another Series 200 design which uses attractive bronze mullion and bronze baseboard along with rimless downlights. The wall is made of sycamore accent combined with frosted glass panel tiles.

Figure 15:
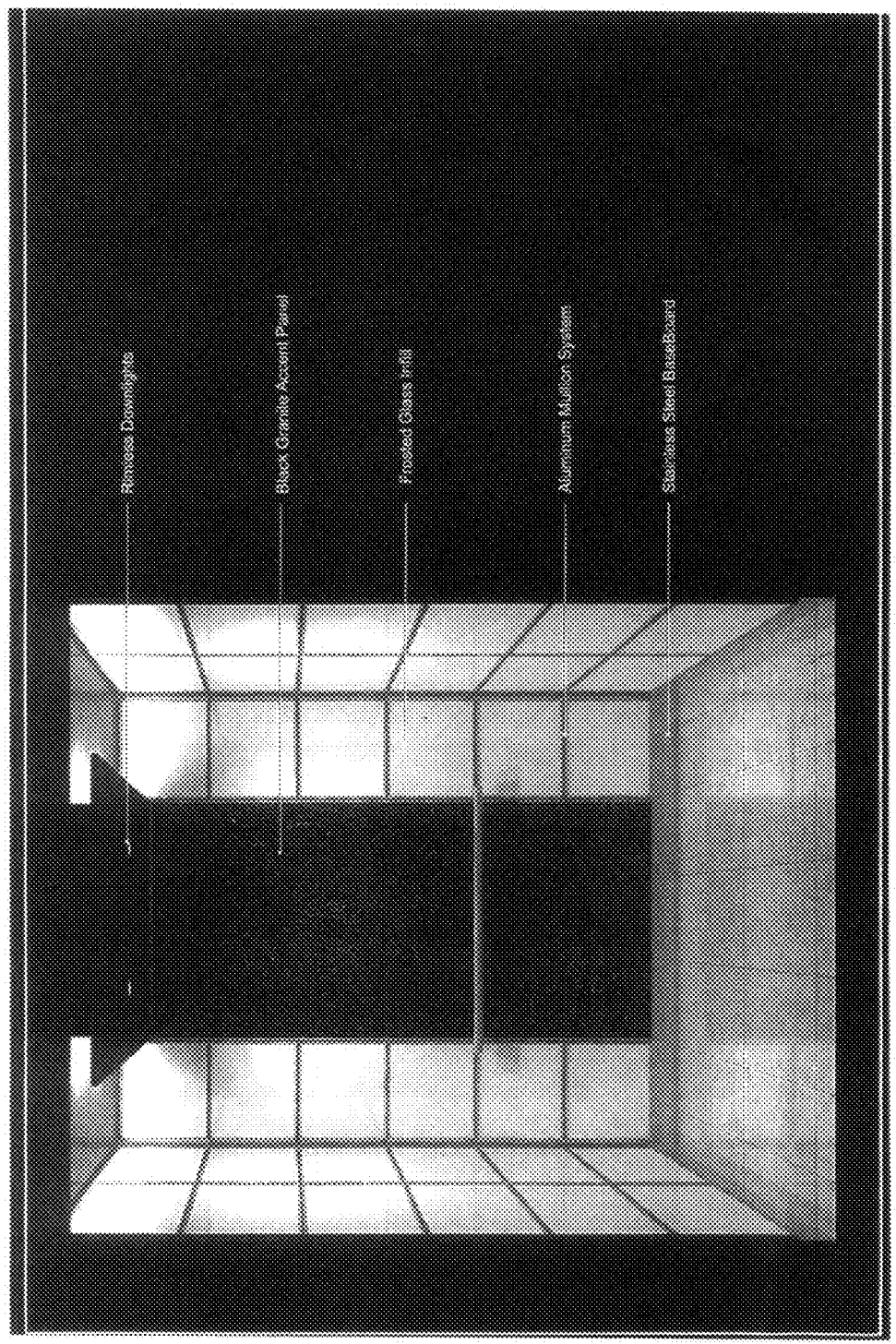
FIG. 15 is a perspective view that illustrates a further Series L200 design which includes an aluminum mullion and stainless steel baseboard.
Figure 16A:
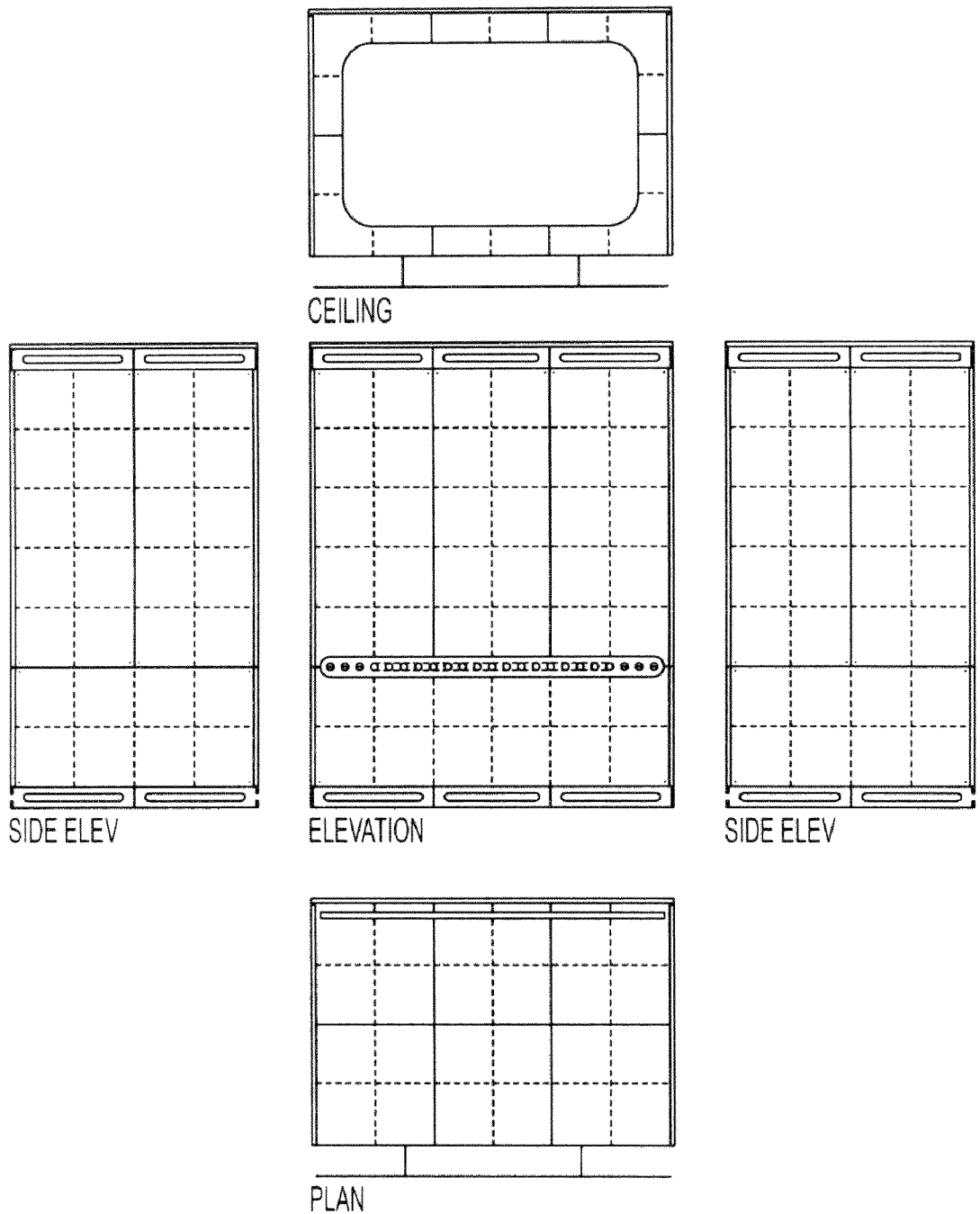

FIG. 15 illustrates another variation of the 200 Series with aluminum mullions and stainless steel baseboards. There the wall is decorated with a black granite back panel and square frosted tile panels.

Various designs and materials from FIGS. 3 to 15 may be combined to complete all the walls of the elevator cab interior or lobby or the designs of the selected series may be repeated to complete all the walls of the elevator cab interior or lobby.

Hypothetical Example of Use of Design Series 300

A series of examples are provided for an embodiment of the invention adapted for use with designing an interior lobby design. It can be appreciated that the invention can be adapted for other interior designs, such as elevator cab designs. In these examples, an institutional property owner had not hired an architect to design a building lobby and desires a interior design for a lobby.

Problem

Wanted a high quality lobby completed in a few months.

Solution

Working from the design method, the customer may find the appropriate design and materials from the illustrations of FIGS. 3-15 that is suited to their building. They could then pick out the metal, wood, stone and glass for the design from the Material Palette Options. Within a few weeks from the initial meeting a design may be selected.

Hypothetical Example of Use of Design Series L400

A major institutional property owner may want to upgrade an unpleasant looking building lobby.

Problem

Although approved, an initial design did not proceed due to budge constraints;

Solution

Two years later, Applicant's method was introduced and a Series L400 design could be selected. Material may be selected from the Material palette and the original budget could be lowered substantially.

Hypothetical Example

A building owner may hire an architect and an interior design firm to do a visual modernization of the building lobby design in a large Eastern city property.

The architect's design may be put out for bid. The Architect's bid which was competitive, was prohibitive because of a long manufacturing lead time.

Hypothetical Example

A building owner of an upscale suburban office building may decide to go ahead with a visual modernization of a lobby design. However, they only have a short period of time to complete the entire project due to capital budget requirements. Normally, selecting an architect, designing the lobby and putting the lobby design out to bid would take a number of months. With a time frame of 14-16 weeks to submit lobby design drawings for approval, the building owner could run out of time using such a traditional approach.

The building management used the present design method series 200 for lobby design. A half day survey of the existing lobby determined that a Series 200 lobby wall would be desirable. The building management is able to select stock materials from the material palette shown in the FIGS. 3-15 and get a quote for their design within a week. The building owner then could approve the project within a week so that the lobby could be installed in a timely manner.

Hypothetical Example

For more than three years, a building owner struggled to find an acceptable plan to visually modernize a building lobby in a classic style building. The existing lobby walls were done in an unpleasant plastic laminate design that was entirely inappropriate. Despite a number of design proposals by both in-house and outside professionals, the building owner was unable to come up with a design that was architecturally attractive with the overall cost kept down.

Finally, by using the present design method, the building owner selected a Series 200 lobby design. In just two meeting the building owner selected materials and approved the project which was well within the budget for the building.

The invention claimed is:

1. A method of interior design comprising:
   providing an interface for displaying a design report for a predetermined architectural design, wherein said design report displays a plurality of design elements selected from the group of optional elements, non-optional elements, and selectable elements;
   wherein said design elements describe at least a portion of said architectural design;
   providing a choice of at least one of the optional and selectable elements for inclusion in said design report; and
   determining design parameters based upon chosen optional elements, non-optional elements, and selectable elements for a selected predetermined architectural design.

2. A method of interior design according to claim 1 further comprising: determining a project schedule based upon the elements included in the design, and displaying said project schedule in said design report.

3. A method of interior design according to claim 1 further comprising: determining availability of the elements from a materials palette included in the design, and displaying availability information in said design report.

4. A method of interior design according to claim 1 further comprising determining conformance of the elements included in the design with project requirements, and displaying project requirement information in said design report.

5. A method of interior design according to claim 1 further comprising determining project building code information based on the chosen design, and displaying project building code information in said design report.

6. A method of interior design according to claim 1 wherein the step of determining design parameters includes determining at least one design parameter selected from the group of dimensions, weight, cost, availability, compliance, and sample approval.

7. The method according to claim 1, wherein the step of providing a choice of at least one of the optional and selectable elements for inclusion in said design report, includes providing a list box for choosing a plurality of optional elements.

8. The method according to claim 1, wherein the step of providing a choice of at least one of the optional and selectable elements for inclusion in said design report, includes providing a materials options display for choosing a plurality of optional elements.

9. A method of interior design comprising:
   providing an interface for displaying a design report;
   providing a selection of a plurality predetermined architectural designs which can be selected from the design report; wherein each of the predetermined architectural designs includes a plurality of design elements selected from the group of optional elements, non-optional elements, and selectable elements;
   providing a choice of at least one of the optional and selectable elements for inclusion in a selected predetermined architectural design; and
   determining design parameters based upon chosen optional elements, non-optional elements, and selectable elements in a selected predetermined architectural design.

10. The method according to claim 9, wherein the step of providing a selection of a plurality of predetermined architectural designs includes providing a choice of a single elevator interior design from a selection of predetermined elevator interior designs.

11. The method according to claim 9, wherein the step of providing a selection of at least one predetermined architectural design includes choosing a lobby design among a selection of predetermined lobby designs.

* * * * *